(12) United States Patent
Sadaghiani et al.

(10) Patent No.: US 10,339,472 B2
(45) Date of Patent: Jul. 2, 2019

(54) SYSTEMS AND METHODS FOR CALIBRATING A MACHINE LEARNING MODEL

(71) Applicant: Sift Science, Inc., San Francisco, CA (US)

(72) Inventors: Fred Sadaghiani, San Francisco, CA (US); Aaron Beppu, San Francisco, CA (US); Jacob Burnim, San Francisco, CA (US); Alex Paino, San Francisco, CA (US)

(73) Assignee: Sift Science, Inc., San Francisco, CA (US)

( * ) Notice: Subject to any disclaimer, the term of this patent is extended or adjusted under 35 U.S.C. 154(b) by 0 days.

(21) Appl. No.: 15/941,175

(22) Filed: Mar. 30, 2018

(65) Prior Publication Data

US 2019/0019109 A1    Jan. 17, 2019

Related U.S. Application Data

(60) Provisional application No. 62/533,564, filed on Jul. 17, 2017, provisional application No. 62/543,952, filed on Aug. 10, 2017.

(51) Int. Cl.
| | |
|---|---|
| *G06F 7/60* | (2006.01) |
| *G06F 17/10* | (2006.01) |
| *G06N 20/00* | (2019.01) |
| *G06F 21/55* | (2013.01) |
| *G06N 3/08* | (2006.01) |
| *G06F 21/57* | (2013.01) |

(Continued)

(52) U.S. Cl.
CPC .......... *G06N 20/00* (2019.01); *G06F 21/552* (2013.01); *G06F 21/554* (2013.01); *G06F 21/577* (2013.01); *G06N 3/08* (2013.01); *G06N 7/005* (2013.01); *G06F 17/50* (2013.01); *G06F 2221/034* (2013.01)

(58) Field of Classification Search
None
See application file for complete search history.

(56) References Cited

U.S. PATENT DOCUMENTS

| | | | | |
|---|---|---|---|---|
| 7,945,545 | B1* | 5/2011 | Sorkin | G06F 17/30884 707/705 |
| 9,043,894 | B1* | 5/2015 | Dennison | G06F 21/552 726/11 |
| 9,838,407 | B1* | 12/2017 | Oprea | H04L 63/1416 |

(Continued)

*Primary Examiner* — Cedric Johnson
(74) *Attorney, Agent, or Firm* — Jeffrey Schox; Padowithz Alce

(57) ABSTRACT

Systems and methods include: collecting digital threat scores of an incumbent digital threat machine learning model; identifying incumbent and successor digital threat score distributions; identifying quantiles data of the incumbent digital threat score distribution; collecting digital threat scores of a successor digital threat machine learning model; calibrating the digital threat scores of the successor digital threat score distribution based on the quantiles data of the incumbent digital threat score distribution and the incumbent digital threat score distribution; and in response to remapping the digital threat scores of the successor digital threat score distribution, publishing the successor digital scores in lieu of the incumbent digital threat scores based on requests for digital threat scores.

16 Claims, 7 Drawing Sheets

(51) Int. Cl.
*G06N 7/00* (2006.01)
*G06F 17/50* (2006.01)

(56) References Cited

U.S. PATENT DOCUMENTS

| | | | | |
|---|---|---|---|---|
| 2015/0373039 | A1* | 12/2015 | Wang | H04L 63/1425 726/23 |
| 2016/0092684 | A1* | 3/2016 | Langton | G06F 21/567 726/23 |
| 2017/0279828 | A1* | 9/2017 | Savalle | H04L 63/1416 |
| 2018/0004948 | A1* | 1/2018 | Martin | H04L 63/1425 |

* cited by examiner

200

```
┌─────────────────────────────────────────┐
│   Sampling Digital Threat Scores S210   │
└─────────────────────────────────────────┘

┌─────────────────────────────────────────┐
│ Generating Threat Score Distribution S220│
└─────────────────────────────────────────┘

┌─────────────────────────────────────────┐
│       Identifying Quantiles S225        │
└─────────────────────────────────────────┘

┌─────────────────────────────────────────┐
│    Sampling Digital Threat Scores of    │
│        Successor Model S230             │
└─────────────────────────────────────────┘

┌─────────────────────────────────────────┐
│  Generating Threat Score Distribution of│
│        Successor Model S240             │
└─────────────────────────────────────────┘

┌─────────────────────────────────────────┐
│   Remapping Digital Threat Scores S250  │
└─────────────────────────────────────────┘

┌ ─ ─ ─ ─ ─ ─ ─ ─ ─ ─ ─ ─ ─ ─ ─ ─ ─ ─ ─ ┐
│       Testing Model Behavior S255       │
└ ─ ─ ─ ─ ─ ─ ─ ─ ─ ─ ─ ─ ─ ─ ─ ─ ─ ─ ─ ┘

┌─────────────────────────────────────────┐
│   Returning Digital Threat Scores S260  │
└─────────────────────────────────────────┘
```

FIGURE 2

SYSTEMS AND METHODS FOR CALIBRATING A MACHINE LEARNING MODEL

CROSS-REFERENCE TO RELATED APPLICATIONS

This application claims the benefit of U.S. Provisional Application Ser. No. 62/533,564, filed on 17 Jul. 2017, U.S. Provisional Application Ser. No. 62/543,952, filed on 10 Aug. 2017, which are incorporated in their entireties by this reference.

TECHNICAL FIELD

This invention relates generally to the digital fraud and abuse field, and more specifically to a new and useful system and method for detecting digital fraud or digital abuse and evolving underlying machine learning models in the digital fraud and abuse field.

BACKGROUND

The modern web and Internet enables entities to engage and perform an incalculable amount of activities. Many of these activities involve user-to-user activities, user-to-business activities (or the reverse), and the like. These activities between users and between users and organizational entities over the web often involve the access, use, and/or exchange of information by one or more of the parties of the activities. Because of the malleable nature of the digital realm that these activities operate within, there arise a countless number of digital threats by digital actors that aim to commit digital fraud and/or digital abuse using online services and/or Internet-accessible applications (e.g., web or mobile applications). Additionally, some of these bad digital actors may also aim to misappropriate the information (e.g., hack) being exchanged between legitimate entities to these activities. These digital threats may also be perpetrated by malicious third-parties who seek to unlawfully or otherwise, impermissibly take advantage of the data or information that is exchanged or, if not exchanged, data or information about the activities or actions of users and/or businesses on the web.

Other digital threats involving a malicious party or a bad digital actor that acts unilaterally (or in concert with other malicious actors) to abuse digital resources of a service provider to perpetrate fraud or other unlawful activities that are also of significant concern to legitimate service providers and users of the Internet.

While there may currently exist some technologies that attempt to detect digital fraud and digital abuse or other malicious digital activities over the Internet, these existing technology implementations may not sufficiently detect malicious digital activities over the Internet with accuracy and in real-time to provide an opportunity for an appropriate response by an affected party. Additionally, these existing technology implementations lack the capabilities to detect new and/or never been encountered before digital threats and automatically (or near automatically) evolve the technology implementation to effectively respond and neutralize the digital threats.

Therefore, there is a need in the digital fraud and abuse field for a digital fraud and abuse solution that enables effective detection of multiple and specific digital threats involving digital fraud and/or digital abuse via digital resources of a service provider. The embodiments of the present application described herein provide technical solutions that address, at least, the need described above.

BRIEF DESCRIPTION OF THE FIGURES

FIG. 2 illustrates an example method in accordance with one or more embodiments of the present application;

DESCRIPTION OF THE PREFERRED EMBODIMENTS

Figure 1:
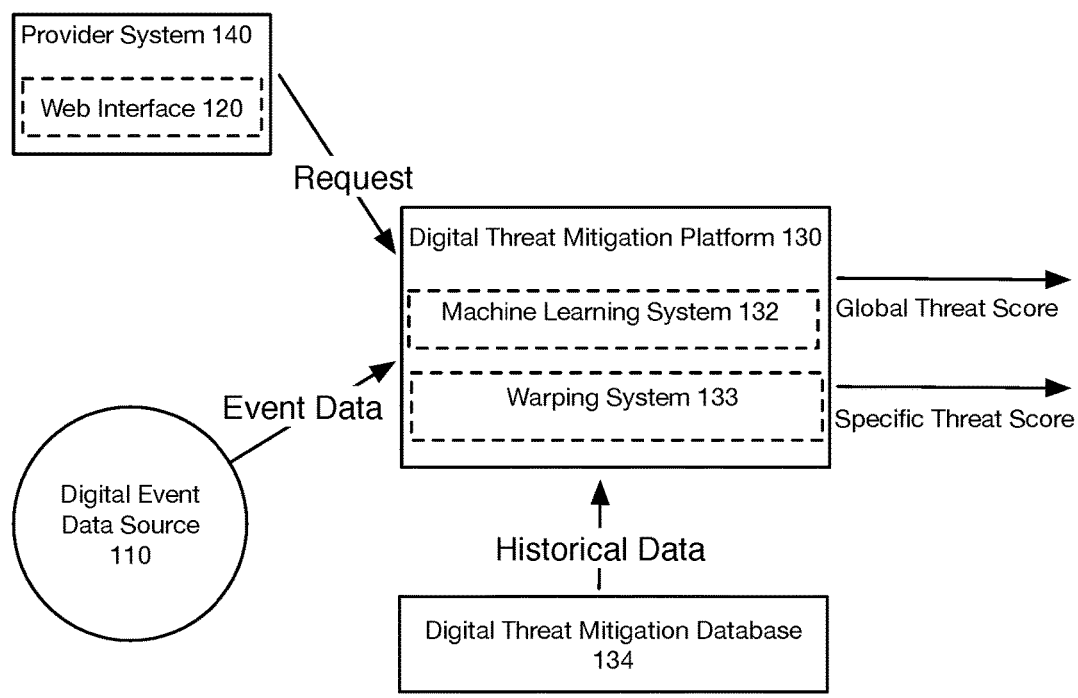
FIG. 1 illustrates a schematic representation of a system in accordance with one or more embodiments of the present application.
Figure 3:
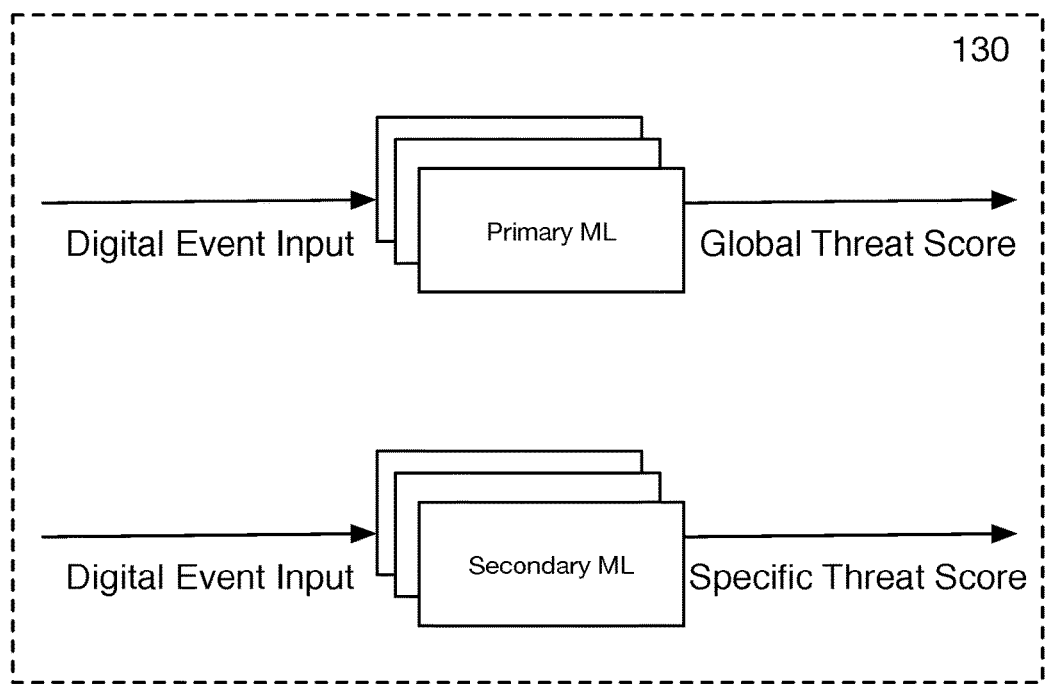
FIG. 3 illustrates an example schematic of a digital threat mitigation platform in accordance with one or more embodiments of the present application.
Figure 4:
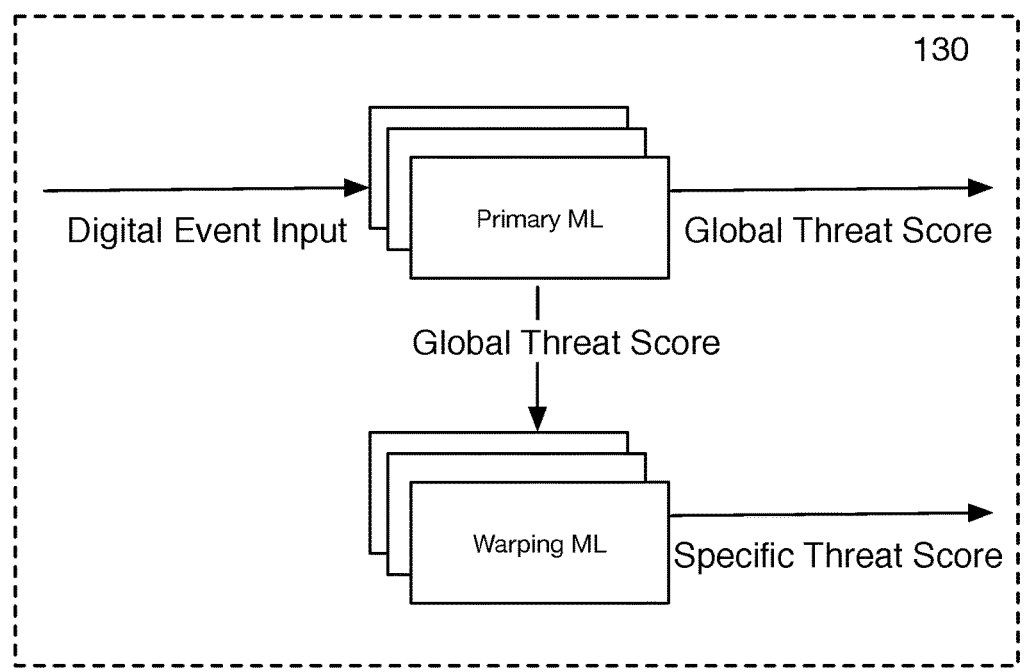
FIG. 4 illustrates an example schematic of a digital threat mitigation platform in accordance with one or more embodiments of the present application.
Figure 5:
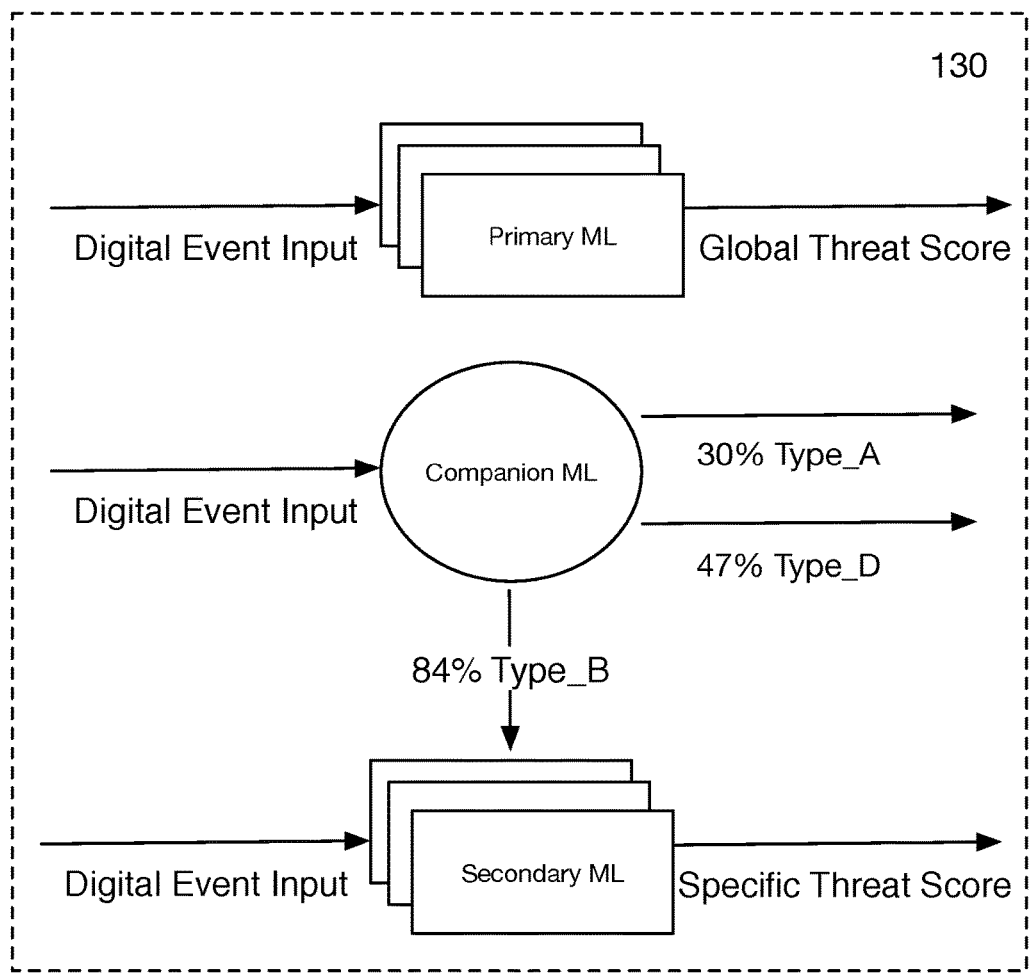
FIG. 5 illustrates an example schematic of a digital threat mitigation platform in accordance with one or more embodiments of the present application.
Figure 6:
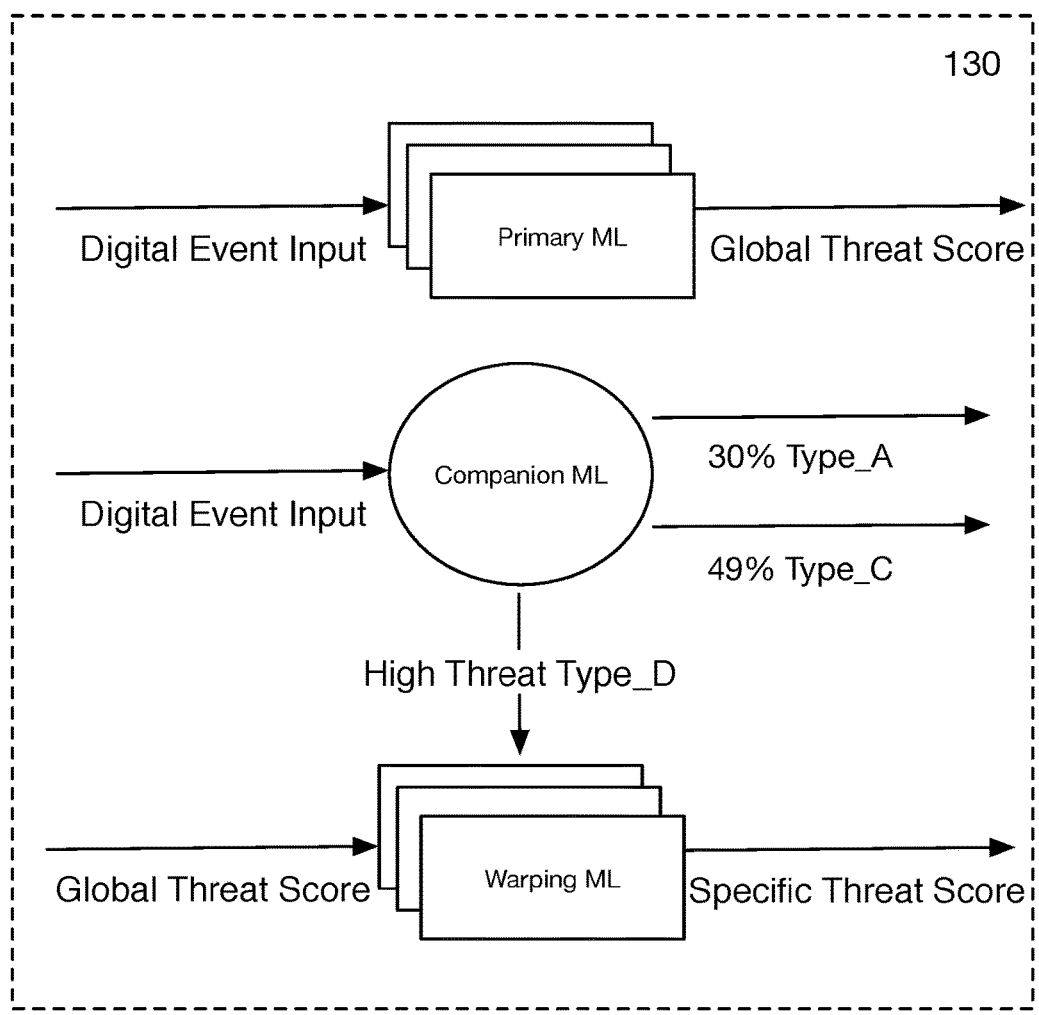
FIG. 6 illustrates an example schematic of a digital threat mitigation platform in accordance with one or more embodiments of the present application.

The following description of the preferred embodiments of the present application are not intended to limit the inventions to these preferred embodiments, but rather to enable any person skilled in the art to make and use these inventions.

1. Overview

As discussed above, digital threats are abounding and continue to evolve to circumvent existing digital fraud detection technologies. The evolving nature of digital threats compounded with the great number of transactions, events, actions, and/or activities (exceeding billions in number) occurring over the web and/or Internet highlight the many deficiencies of traditional digital fraud detection and threat mitigation implementations.

The embodiments of the present application, however, provide an advanced technology platform that is capable of ingesting billions of digital events and/or transactions over the Internet, the web, web applications, mobile applications, and the like and dynamically implement digital threat mitigation implementations that are capable of detecting malicious activities, fraudulent activities, digital abuses and generate digital threat mitigation recommendations and responses that operate to mitigate and/or eliminate the digital fraud and abuse threats stemming from the malicious or fraudulent activities.

The advanced technology platform of many embodiments of the present application employs a robust ensemble of machine learning models and related systems that operate to ingest the great number of digital activities performed and events occurring over the web. Accordingly, using these finely tuned and perpetually evolving and tunable machine learning models, a system implementing the several embodiments of the present application can predict a threat level and/or classify a digital threat with high accuracy and, in some embodiments, in real-time (e.g., as the event is occurring or shortly thereafter) compute a digital threat score for each event or activity that is received by the system.

The digital threat score may be exposed via a score application program interface (API) that may function to interact with various endpoints of the digital threat mitigation platform. Specifically, the score API may function to interact with one or more computing servers that implement the ensembles of machine learning models used to predict a likelihood of digital fraud and/or digital abuse. The score API may function to return a value (e.g., a number, likelihood or probability, or other criterion) that indicates how likely it is that an actor involved or associated with digital events and/or activities is a malicious actor or may be perpetrating cyber fraud or digital abuse (e.g., payment abuse, etc.). Accordingly, the digital threat score calculated by the score API may be used in several manners including to inform digital event data processing decisions (e.g., deny, hold, or approve digital transaction) or to define which of one or more digital threat mitigation protocols or implementations that should be applied to future digital event data and/or current the digital events to mitigate or eliminate a digital threat associated therewith.

Additionally, recognizing that in some circumstances service providers that provide online and/or digital resources to users may need to mitigate or prevent multiple forms of digital fraud and/or digital abuse simultaneously, the embodiments of the present application enable the generation of a global digital threat score and a plurality of specific digital threat scores for varying, known digital fraud or abuse types. Accordingly, while the global digital threat score may indicate to the service provider a general indication of the existence of digital fraud and/or digital abuse in digital events data, the specific digital threat scores for the plurality of digital abuse types function to specifically identify a type of fraud or abuse that is being committed in a digital events dataset. These specific indications allow the service provider and/or the digital threat mitigation platform to implement digital threat mitigation or prevention actions that effectively address the specific digital fraud or abuse.

2. Model Calibration Overview

As digital threats evolve, it is also necessary that the digital threat mitigation platform evolve the underlying digital threat detecting machine learning models that generally function to identify digital events that may involve a level of digital threat or digital abuse. However, changing the underlying digital threat machine learning models may adversely affect the distribution of threats detected by the platform and/or service providers using the digital threat mitigation platform as the thresholds implemented by service providers for detecting digital threats and non-digital threats may remain constant.

Accordingly, a change in an underlying digital threat machine learning model implemented digital event classification for a specific service provider using the digital threat detection services of the digital threat mitigation platform may cause unexpected shifts or unusually large shifts in the classification proportions of users of the services of the service provider or the classification proportions of events involving the services of the service provider that the machine learning model scores or predicts to be or involve a threat. That is, the digital threat scores generated by a new or a target successor model that is replacing an existing or incumbent model of a specific service provider may produce digital threat scores with a different score distribution than a prior score distribution of the incumbent model and in the context of using fixed evaluation thresholds for initiating automated reactions (e.g., blocking an order, banning a user, etc.) to events or users, this may cause large shifts in the proportion of events or users that receive the automated reactions. Accordingly, this sensitivity to the shifts of a number of automated reactions and/or non-automated reactions (e.g., manual reviews) that is experienced by service providers is primarily a result of a lack of an update to the fixed automated decisioning thresholds even though the underlying machine learning scoring model has been changed.

In some embodiments, the sensitivity level that may be experienced by a service provider due to a migration from an old machine learning model to a new machine learning model may be measured or estimated. The measured sensitivity may be used the machine learning system of the present application to trigger a calibration of a new machine learning model being installed for a specific service provider. For instance, a number of automated decision for a given dataset may be calculated for each of an old and new machine learning model. If the machine learning system measures that an increase or decrease of a number of automated decisions has increased or decreased based on the scoring outcomes of the new machine learning model at or beyond one or more sensitivity thresholds, the machine learning system may determine that the sensitivity level experienced by a service provider may be significant and therefore, trigger a calibration of a proposed new machine learning model prior to enabling live scoring with the new machine learning model.

Thus, while the new digital threat scoring model may produce new and more accurate digital threat scores, the predetermined or fixed automated decisioning thresholds of a specific service provider may not have been updated or changed to take into account the changes in an underlying threat score distribution of the new digital threat scoring machine learning model. As a result, significant disruptions in the ability of a service provider or the platform to accurately perform digital threat detection may be caused because too few or too large digital threat detections in specific classification classes may be identified as a result of the new digital threat scores of the new digital threat model not being in line with the prior or maintained digital threat detection thresholds (i.e., the automated decisioning thresholds). It shall be noted that automated decisioning thresholds for specific services providers may not necessarily be known to a machine learning service and/or the digital threat mitigation platform that performs one or more of the methods described herein. Nevertheless, the machine learning service or other system implementing the methods may function to calibrate successor machine learning models without an express knowledge of the automated decisioning thresholds.

Additionally, because the digital threat mitigation platform may function to produce many model changes and updates (e.g., hundreds or thousands of model changes and updates), it may be extremely difficult to continually determine proper updates to the thresholds used for detecting digital threat based on the digital threat scores produced by the new digital threat scoring models.

The embodiments of the present application, however, provide systems and methods that enable the evolution and changes to an underlying machine learning model for detecting digital threats while minimizing or ameliorating the probabilities of disruption in the detection of digital threat events using prior or unchanged digital threat detection thresholds applied against new digital threat scores of new digital threat models being implemented in the underlying machine learning model change. In this way, while a service provider or the like may be migrated to an improved digital threat scoring machine learning model that may detect digital threats with higher accuracy and faster than a prior model, confusing disruptions in the digital threat detection capabilities are mitigated by preserving a digital threat score distribution between a prior digital threat scoring machine learning model and the new digital threat scoring machine learning model.

3. System for Digital Fraud and/or Abuse Detection and Scoring

As shown in FIG. 1, a system 100 for detecting digital fraud and/or digital abuse includes one or more digital event data sources 110, a web interface 120, a digital threat mitigation platform 130, and a service provider system 140.

The system 100 functions to enable a prediction of multiple types of digital abuse and/or digital fraud within a single stream of digital event data. The system 100 provides web interface 120 that enables users to generate a request for a global digital threat score and additionally, make a request for specific digital threat scores for varying digital abuse types. After or contemporaneously with receiving a request from the web interface 120, the system 100 may function to collect digital event data from the one or more digital event data sources no. The system 100 using the digital threat mitigation platform 130 functions to generate a global digital threat score and one or more specific digital threat scores for one or more digital abuse types that may exist in the collected digital event data.

The one or more digital event data sources no function as sources of digital events data and digital activities data, occurring fully or in part over the Internet, the web, mobile applications, and the like. The one or more digital event data sources 110 may include a plurality of web servers and/or one or more data repositories associated with a plurality of service providers. Accordingly, the one or more digital event data sources 110 may also include the service provider system 140.

The one or more digital event data sources 110 function to capture and/or record any digital activities and/or digital events occurring over the Internet, web, mobile applications (or other digital/Internet platforms) involving the web servers of the service providers and/or other digital resources (e.g., web pages, web transaction platforms, Internet-accessible data sources, web applications, etc.) of the service providers. The digital events data and digital activities data collected by the one or more digital event data sources 110 may function as input data sources for a machine learning system 132 of the digital threat mitigation platform 130.

The digital threat mitigation platform 130 functions as an engine that implement at least a machine learning system 132 and, in some embodiments, together with a warping system 133 to generate a global threat score and one or more specific digital threat scores for one or more digital abuse types. The digital threat mitigation platform 130 functions to interact with the web interface 120 to receive instructions and/or a digital request for predicting likelihoods of digital fraud and/or digital abuse within a provided dataset. The digital threat mitigation engine 130 may be implemented via one or more specifically configured web or private computing servers (or a distributed computing system) or any suitable system for implementing system 100 and/or method 200.

The machine learning system 132 functions to identify or classify features of the collected digital events data and digital activity data received from the one or more digital event data sources no. The machine learning system 132 may be implemented by a plurality of computing servers (e.g., a combination of web servers and private servers) that implement one or more ensembles of machine learning models. The ensemble of machine learning models may include hundreds and/or thousands of machine learning models that work together to classify features of digital events data and namely, to classify or detect features that may indicate a possibility of fraud and/or abuse. The machine learning system 132 may additionally utilize the input from the one or more digital event data sources 110 and various other data sources (e.g., outputs of system 100, system 100 derived knowledge data, external entity-maintained data, etc.) to continuously improve or accurately tune weightings associated with features of the one or more of the machine learning models defining the ensembles.

The warping system 133 of the digital threat mitigation platform 130, in some embodiments, functions to warp a global digital threat score generated by a primary machine learning ensemble to generate one or more specific digital threat scores for one or more of the plurality of digital abuse types. In some embodiments, the warping system 133 may function to warp the primary machine learning ensemble, itself, to produce a secondary (or derivative) machine learning ensemble that functions to generate specific digital threat scores for the digital abuse and/or digital fraud types. Additionally, or alternatively, the warping system 133 may function to implement a companion machine learning model or a machine learning model that is assistive in determining whether a specific digital threat score should be generated for a subject digital events dataset being evaluated at the primary machine learning model. Additionally, or alternatively, the warping system 133 may function to implement a plurality of secondary machine learning models defining a second ensemble that may be used to selectively determine or generate specific digital threat scores. Accordingly, the warping system 133 may be implemented in various manners including in various combinations of the embodiments described above.

The digital threat mitigation database 134 includes one or more data repositories that function to store historical digital event data. The digital threat mitigation database 134 may be in operable communication with one or both of an events API and the machine learning system 132. For instance, the machine learning system 132 when generating global digital threat scores and specific digital threat scores for one or more specific digital abuse types may pull additional data from the digital threat mitigation database 134 that may be assistive in generating the digital threat scores.

The ensembles of machine learning models may employ any suitable machine learning including one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and any other suitable learning style. Each module of the plurality can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial lest squares regression, Sammon mapping, multidimensional scaling, projection pursuit, etc.), an ensemble method (e.g., boosting, boostrapped aggregation, AdaBoost, stacked generalization, gradient boosting machine method, random forest method, etc.), and any suitable form of machine learning algorithm. Each processing portion of the system 100 can additionally or alternatively leverage: a probabilistic module, heuristic module, deterministic module, or any other suitable module leveraging any other suitable computation method, machine learning method or combination thereof. However, any suitable machine learning approach can otherwise be incorporated in the system 100. Further, any suitable model (e.g., machine learning, non-machine learning, etc.) can be used in generating endpoint health intelligence and/or other data relevant to the system 100.

The service provider 140 functions to provide digital events data to the one or more digital event data processing components of the system 100. Preferably, the service provider 140 provides digital events data to an events application program interface (API) associated with the digital threat mitigation platform 130. The service provider 140 may be any entity or organization having a digital or online presence that enable users of the digital resources associated with the service provider's online presence to perform transactions, exchanges of data, perform one or more digital activities, and the like.

The service provider 140 may include one or more web or private computing servers and/or web or private computing devices. Preferably, the service provider 140 includes one or more client devices functioning to operate the web interface 120 to interact with and/or communication with the digital threat mitigation engine 130.

The web interface 120 functions to enable a client system or client device to operably interact with the remote digital threat mitigation platform 130 of the present application. The web interface 120 may include any suitable graphical frontend that can be accessed via a web browser using a computing device. The web interface 120 may function to provide an interface to provide requests to be used as inputs into the digital threat mitigation platform 130 for generating global digital threat scores and additionally, specific digital threat scores for one or more digital abuse types. In some embodiments, the web interface 120 includes an application program interface that is in operable communication with one or more of the computing servers or computing components of the digital threat mitigation platform 130.

The web interface 120 may be used by an entity or service provider to make any suitable request including requests to generate global digital threat scores and specific digital threat scores.

Additionally, as shown in FIG. 2-FIG. 6, the systems and methods described herein may implement the digital threat mitigation platform in accordance with the one or more embodiments described in the present application as well as in the one or more embodiments described in U.S. patent application Ser. No. 15/653,373, which is incorporated by reference in its entirety.

3.1 Sub-System for Calibrating for ML Model Changes

Figure 7:
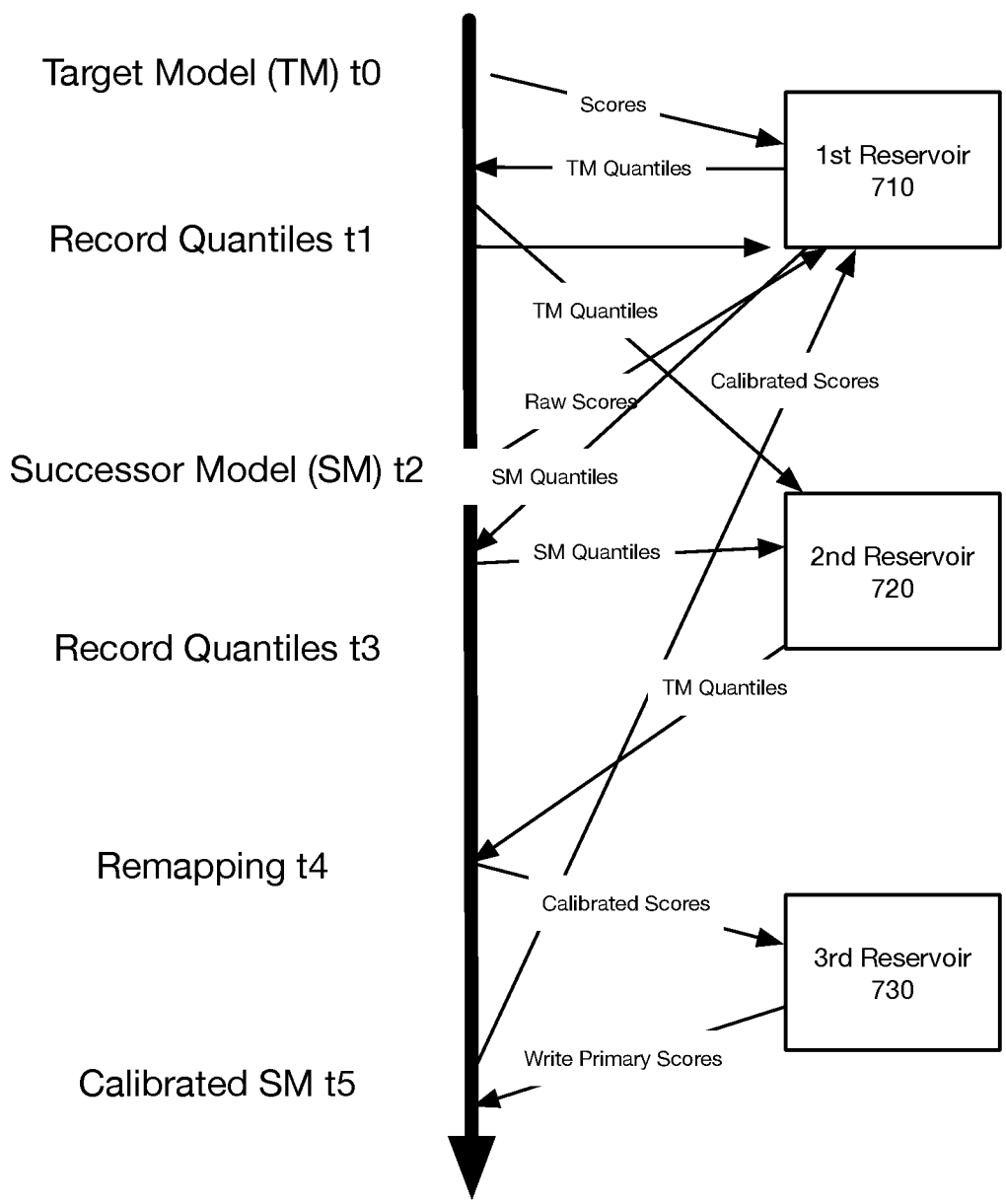
FIG. 7 illustrates an example schematic of a sub-system for calibrating model changes in accordance with one or more embodiments of the present application.

As shown in FIG. 7, a sub-system 700 of the system 100 for calibrating for digital threat score model changes include a first reservoir 710, a second reservoir 720, and a third reservoir 730.

The first reservoir 710 may include a database or datastore that is preferably configured to store samples of digital threat scores generated by a target digital threat score machine learning model, such as an incumbent digital threat score machine learning model as described herein below. The first reservoir 710 may include logic or software modules, such as a counter module and quantiles capturing module, that function to generate a count value for each of the digital threat scores collected and stored by the first reservoir 710 and further, capture or identify quantiles of a score distribution formed by the collected digital threat scores of the target model.

The first reservoir 710 may also function to collect raw or uncalibrated digital threat scores of a second digital threat score machine learning model and similarly, increment a separate counter for each of the digital threat scores collected therefrom and further, produce quantiles data thereof.

The first reservoir 710 may function to output the quantiles data and, in some embodiments, the score distribution data of each of the target model and the successor model to a second reservoir 720.

The second reservoir 720 may primarily function as a quantiles reservoir that stores quantiles data for each of the target model and the successor model, preferably during calibration of the raw scores of the successor model. The second reservoir 720 may function to store multiple quantiles for each of the target model and successor model and preferably, together with a timestamp of creation of the quantiles so that a remapping function may be able to identify quantiles captured latest in time.

The second reservoir 720 may function to output to a third reservoir 730 quantiles data of a target model such that a remapping function of the third reservoir 730 may function to implement a remapping of the raw or uncalibrated scores of a successor digital threat ML model.

The third reservoir 730 may function as a remapping reservoir that functions to calibrate the uncalibrated scores of a successor digital threat machine learning model by remapping uncalibrated scores of the successor digital threat model to the digital threat scores of the target model. As described in more detail herein below, the remapping function implemented by the third reservoir 730 may be triggered based on the satisfaction of one or more conditions within the second reservoir 720 and/or the first reservoir 710 relating, at least, to a recording of score distributions of the target model and successor model and recordation of quantiles of the score distributions of the target model. Once triggered, the remapping function of the third reservoir may function to remap digital threat scores between a pair of score distributions including the score distribution of the target model and the score distribution of the uncalibrated successor model. Using a monotonic function, the remapping function may generate a calibrated score distribution for the successor model that maintains or is approximate to the score distribution of the target model.

The third reservoir 730 may function to record any remapping of the uncalibrated score distributions of the successor model as well as the calibrated score distributions derived therefrom. Additionally, the third reservoir 370 may automatically publish calibrated digital threat scores of the successor model based on a detection or completion of the remapped or calibrated score distribution of the successor model. Additionally, or alternatively, the automatic publishing of the calibrated digital threat scores of the successor model may be automatically triggered based on an automatic comparison of the score distribution of target model and the calibrated score distribution of the successor model having a variance below a maximum distribution variance threshold. The maximum distribution variance threshold may be a predetermined value or a dynamic value determined based at least on a count of digital threat score values that make up the score distributions for the target and successor models. The lower the count, the greater the dynamic variance threshold may be and the higher the count of digital threat score, the lower the dynamic variance threshold may be.

Alternatively, the third reservoir may function to reserve the calibrated digital threat scores of the calibrated score distribution of the successor model and publish calibrated digital threat scores only after a verification of the calibrated score distribution is performed.

4. Method for Mitigated Model Reconfiguration and Model Score Calibration

As shown in FIG. 2, the method 200 includes collecting digital threat scores of an incumbent machine learning model S210, generating a digital threat score distribution for the incumbent machine learning model S220, identifying quantiles for the digital threat score distribution for the incumbent S225, collecting digital threat scores of a successor machine learning model S230, generating a digital threat score distribution for the successor machine learning model S240, remapping the digital threat score of the successor distribution machine learning model S250, and returning one or more digital threat scores S260.

The method 200 preferably functions to enable a seamless migration from a prior machine learning model (i.e., incumbent ML model) to a new machine learning model (i.e., successor ML model) with improved classification accuracy and/or improved predictive capabilities. In a preferred embodiment, the method 200 is implemented in a live and/or online (not offline) system that is actively connected to the Internet (or one or more web servers, etc.) and performs digital threat detection based on live digital events, live threat scoring requests, and the like. In such preferred embodiments, while a prior or an incumbent ML model is used to ingest digital events data and produce live threat scores, a second (raw/uncalibrated) new or successor ML model may be implemented simultaneously in a shadow mode during a period in which the same digital events data is ingested and digital threat scores produced by the successor ML model that are not returned or exposed for the digital events data under evaluation.

Accordingly, the method 200 includes capturing a threat score distribution of the incumbent ML model as well as a threat score distribution of the successor ML model based on a same set of timestamped digital events data. While the threat score distributions of the incumbent ML model and the successor ML model may vary, the method 200 functions to (approximately) preserve the general threat score distribution of the incumbent ML model within the threat score distribution of successor ML model by capturing score quantiles data of the threat score distributions of the incumbent ML model and the successor ML model and using the quantiles data to produce a monotonic function. The monotonic function may be applied to the threat score distribution of the successor ML model to remap the raw scores thereof such that the threat score distribution of the incumbent ML model is (approximately) preserved.

Once this initial quantiles-driven calibration is imposed on the threat score distribution of the successor ML model, the method 200 additionally, or alternatively, may function to perform classification accuracy testing and calibration between the raw threat scores and the quantiles-driven calibrated threat scores of the successor ML model may be performed. Specifically, the method 200 may optionally derive ROC curve data for each of the raw/uncalibrated successor ML model and the calibrated successor ML model based on a same set of digital events data (e.g., live digital events or historical digital events data). Once the ROC curve data is determined, the method 200 may function to compare the ROC curve for the uncalibrated successor ML model to the ROC curve for the calibrated successor model to ensure that is match or a substantial match between the ROC curves. A match between the ROC curves would indicate that the classification accuracy of the uncalibrated successor ML model is preserved within the calibrated successor ML model.

4.1 Incumbent Machine Learning Model

S210, which includes collecting digital threat scores, functions to collect sample digital threat scores generated by an incumbent digital threat machine learning (ML) model. Specifically, during a normal course of operating the incumbent digital threat ML model, S210 may function to operate a first threat score reservoir to collect samples of digital threat scores being generated at the incumbent digital threat ML model. Accordingly, S210 may function to collect sample digital threat scores produced in response to threat score requests (from service providers, customers, etc.) and/or threat scores that are automatically generated by a system implementing the method 200.

In a preferred embodiment, the incumbent digital threat ML model may be a machine learning model that is specifically configured to evaluate digital events (e.g., online transactions, online activities, etc.) and/or digital actors (users) and generate one or more of a threat classification and a digital threat score based on the features of the digital events and/or digital actors. Accordingly, a system (e.g., system 100) implementing the incumbent digital threat ML model may function to implement or operate a feature extractor that identifies relevant features of the digital events data, extract or collect those features from the digital events data, and provide the extracted features as input machine learning input into the incumbent digital threat ML model. Thus, the system (or platform) may generate digital threat scores in accordance with the one or more embodiments described in U.S. patent application Ser. No. 15/653,373, which is incorporated by reference in its entirety.

The digital threat score generation by the incumbent digital threat ML model may be synchronous or asynchronous. That is, in some embodiments, when a synchronous request for a threat score for a given event data or user is received by a system implementing the method 200, the requester waits until the system responds directly to the request with the threat score. Accordingly, a synchronous request may trigger an immediate (e.g., within 1 second to 2-3 minutes, etc.) or near-immediate threat score generation and response by the system. Additionally, or alternatively, a system implementing the method 200 may asynchronously generate a threat score and return the threat score to a client in the absence of an explicit request for a threat score. Additionally, in the case that an asynchronous request is received by the system, the system may function generate a threat score for a given event data or user at a later time and returns the generated threat score to a requestor with a (API) call back to the requestor at the later time. Thus, in an asynchronous mode of operating a system implementing the method 200 may function to receive and process multiple asynchronous threat score requests and return threat scores in response to the requests as the threat scores become available at a later time.

Additionally, or alternatively, S210 may function to specifically configure the first digital threat score reservoir. As discussed briefly, S210 may function to collect and record samples of digital threat scores generated by the incumbent digital threat ML model into a first digital threat score reservoir. S210 may function to configure the first reservoir with logic that enables the first reservoir to arrange the collected digital threat scores in a predetermined manner as well as count the digital threat scores as they are collected. For instance, the first reservoir may include a counter that functions to increment by an integer in an increasing manner for each digital threat score received and recorded within the first reservoir. In a preferred embodiment, S210 may function to store a specific count (as metadata or the like) for each specific digital threat score received at the first reservoir in association with the digital record for the specific digital threat score. For instance, if a digital threat score of "80" is received at the first reservoir and it is the third digital threat score collected by the first reservoir, S210 may function to store the digital threat score "80" in electronic association with the count of "3". In this way, a correlation may be established between digital threat scores of the incumbent digital threat ML model and digital threat scores of a successor digital threat ML model.

It shall be noted that S210 may function to generate or collect any additional data associated with the collected digital threat scores including a time range or period over which all the digital threat scores were collected, a time of capture or timestamp for each of the digital threat scores, a first and last score time, a number of scores captures, and the like. These additional digital threat score data may also be stored in association with respective digital threat scores, preferably as metadata.

S210 may continue to collect digital threat scores produced by the incumbent digital threat ML model using the first digital threat score reservoir until sufficient digital threat score values are collected that satisfy predetermined statistical values or thresholds.

It shall be noted that if multiple digital threat scoring models are implemented for a specific service provider, S210 may function to store samples of digital threat scores from each of those models and preferably, store a model identifying value in association with each digital threat score collected in stored within a reservoir or the like.

S220, which includes generating a digital threat score distribution for the incumbent machine learning model, functions to arrange the recorded sample digital threat scores collected from the incumbent digital threat ML model into a score distribution.

Preferably, S220 functions to apply a cumulative distribution function to the stored digital threat scores to generate a cumulative distribution. In this way, the recorded digital threat scores may be illustrated in a score distribution in which the digital threat scores are ranked in an ascending (or descending) manner and bounded between zero and one [0,1] (or [0, 100]). Thus, irrespective of the time at which the digital threat scores were generated by the digital threat ML model, the generated score distribution provides a comprehensible order to the digital threat scores that enables a further capture or determination of quantiles of the score distribution.

Accordingly, once a score distribution of the stored digital threat scores is generated, S220 may additionally function to capture or determine quantiles for the score distribution of the digital threat scores produced by the incumbent digital threat ML model. The quantiles may include a list of indices in which the indices represent equally-spaced scores (or cumulative probabilities at equal points along the score distribution), and the score values at each index is the proportion of probability mass that is less than the score value of the respective index. Accordingly, the quantiles function to divide the score distribution into equal parts. For instance, a score distribution may be divided according to quartiles, percentiles, deciles, and the like. It shall be noted that any suitable quantile for a given score distribution may be captured or determined.

Additionally, S220 may function to store identified quantiles of a given score distribution in association with the given score distribution. Specifically, S220 may function to store the identified quantiles in the first digital threat score reservoir in electronic association with the one or more score distributions of the incumbent digital threat ML model stored therein.

4.2 Configuring a Successor Model

S230, which includes collecting digital threat scores of a successor digital threat machine learning (ML) model, functions to collect sample digital threat scores generated by the successor digital threat ML model. The successor digital threat ML model may be an emergent scoring model that may function to succeed the incumbent digital threat ML model for producing digital threat scores for a specific service provider or the like.

In some embodiments, S230 may function to operate the successor digital threat ML model in parallel or simultaneously with the incumbent digital threat ML model, however, the successor digital threat ML mode may be operated in a shadow mode in which its scores are produced but not exposed (live) to a service provider or customer. In this regard, the successor digital threat ML model may function to receive equivalent or same digital event inputs as the incumbent digital threat ML model. That is, S230 may operate the successor digital threat ML model such that each dataset (e.g., extracted features, metadata, etc.) for evaluation of a given digital event that is provided as input into the incumbent digital threat ML model may also be provided to the successor digital threat ML model and preferably, provided as input in the same order. In this way, both the incumbent and the successor models are generating comparable digital threat scores. Comparable in the sense that the digital threats scores produced by the incumbent and successor models find basis in the same datasets without necessarily having a same score value.

Additionally, or alternatively, S230 may function to provide a count value to each of the digital threat scores of the successor digital threat ML model. The count value may be stored (as metadata or the like) in association with a given digital threat score in the second digital threat score reservoir.

In operation, S230 may function to operate the successor digital threat ML model in a private mode or a shadow mode in which the successor digital threat ML model receives digital events data (or extracted features input, etc.) and generates digital threat scores therefrom. However, in the private or shadow mode, the digital threat scores derived or generated by the successor digital threat ML model are not returned or exposed to a service provider. Rather, S230 functions to collect and store the generated digital threat scores produced by the successor digital threat ML model in the private or shadow mode to a second digital threat score reservoir as uncalibrated digital threat scores.

An uncalibrated digital threat score, as referred to herein may typically refer to a digital threat score that is generated or produced by a (raw) successor digital threat ML model and that has not been calibrated according to a reference model (e.g., incumbent model) or a score distribution of a reference model. Accordingly, an uncalibrated digital threat score may be a digital threat score that is in a raw form and/or untransformed condition relative to a digital threat score that is calibrated or a digital threat score of a live incumbent model and publicly returnable or exposable to a service provider as a valid or useable digital threat score. In some embodiments, an uncalibrated digital threat score may be used for improving a machine learning model and general comprehension rather than as a score for indicating a measure or likelihood of an actual digital threat to a service provider or the like based on the digital event data used to generate the uncalibrated digital threat score.

In a similar manner as described in S220, S240, which includes generating a digital threat score distribution for the successor digital threat ML model, functions to generate a score distribution using the (uncalibrated) digital threat scores of the successor digital threat ML model stored in the second digital threat score reservoir. That is, S240 preferably applies a cumulative distribution function to the collection of digital threat scores of the successor model that generates a cumulative score distribution.

From the score distribution of the successor digital threat ML model, S240 may additionally function to identify and/or capture quantiles within the score distribution and correspondingly, store the quantiles data in electronic association with the score distribution from which the quantiles data was derived. In some embodiments, the quantiles may be the same as the quantiles captured in the score distribution of the digital threat scores produced by the incumbent digital threat ML model.

Alternatively, the quantiles of the score distribution of the successor digital threat ML model may be different from the quantiles captured in the score distribution of the digital threat scores produced by the incumbent digital threat ML model. In latter embodiments, the quantiles of the successor model may be different from the incumbent model when a score distribution of the successor model is sufficiently different from a score distribution of the incumbent model such that the proportion of scores falling within a fixed score range under the successor model differs meaningfully from the proportion of scores falling within the same range under the incumbent model.

4.3 Configuring a Calibrated Successor Model

S250, which includes remapping the digital threat score distribution of the successor distribution machine learning model, functions to calibrate the stored digital threat scores and/or the stored digital threat score distribution of the successor digital threat ML model. In a preferred embodiment, S250 may function to detect one or more remapping conditions that function to automatically trigger a remapping (or calibration) of the uncalibrated digital threat scores of the successor digital threat ML model.

Generally, S250 functions to remap a score distribution of an incumbent digital threat ML model to an uncalibrated score distribution of a successor digital threat ML model to generate a calibrated score distribution of the successor digital threat ML model based on quantiles data captured from the score distribution of the incumbent model in a manner that preserves the score distribution of the incumbent model within the score distribution of the successor model (i.e., quantiles remapping). Additionally, as discussed further below, the remapping function may also function to ensure that the classification accuracy of the uncalibrated successor model is preserved within the calibrated successor model.

Additionally, it shall be noted that the remapping function, by virtue of being based on specific, timestamped threat score distributions, generally does not hold the calibrated threat score distribution of the successor model fixed over time. However, at an outset of a transition from an incumbent ML model to a successor ML model, S250 may implement a fixed remapping function that causes the uncalibrated score distribution of the successor ML model to match the score distribution of the incumbent ML model over an initial, fixed period during which both the incumbent ML model and the successor ML model have recorded threat scores.

S250 may function to detect one or more remapping conditions including an existence of a completed digital threat score distribution comprising digital threat scores generated by the incumbent digital threat ML model, an existence of quantiles of the score distribution of the incumbent digital threat ML model, and an existence of a completed digital threat score distribution of the digital threat scores generated by the successor digital threat ML model. Thus, S250 may function to scan each of the first digital threat score reservoir and the second digital threat score reservoir (or any other reservoir or database) to identify or detect datasets or storage records corresponding to each of the required one or more remapping conditions.

In general terms, the one or more remapping conditions may be defined in any suitable manner and may not necessarily be tied to the score distributions and quantiles of an incumbent digital threat ML model. Rather, the one or more remapping conditions may be associated or tied to any designated target digital threat score(s), threat score distributions, and/or machine learning model. Accordingly, S250 may function to detect a score distribution and associated quantiles of any designated target model that may be necessarily different than an incumbent digital threat machine learning model that is actively used to produce digital threat scores for a specific service provider of a system and/or service implementing the method 200.

In one variant, S250 may function to trigger a remapping function based on a partial score distribution of the incumbent digital threat ML model (e.g., a target model). That is, in some embodiments, a sufficient number of scores produced by the incumbent digital threat ML model may not have been recorded into the first digital threat reservoir and therefore, fails to meet a statistical threshold for generating a complete score distribution. In such embodiments, even if the statistical thresholds for completeness of the score distribution is not met, S250 may generate the partially completed score distribution and correspondingly capture quantiles of the partial score distribution of the incumbent digital threat ML model and record the partial score distribution and quantiles within the first digital threat score reservoir.

In this variant, a similar partial score distribution may be generated for a successor digital threat ML model and associated quantiles captured therefrom and stored in a second digital threat score reservoir. Since an implemented successor model may most likely use the same digital event data inputs as used with the incumbent digital threat ML model to produce digital threat scores, the second digital threat score reservoir may most likely include a similar count digital threat scores as the first digital threat score reservoir that collects and records sample digital threat scores of the incumbent digital threat ML model.

In a further variant, if S250 detects that the one or more remapping conditions are not satisfied based on incomplete score distributions or the like and a request or requirement for implementing a new model (e.g., a successor model) has been identified, S250 may function to predictively complete the score distributions for each of a target model (e.g., an incumbent model) and the successor model by deriving digital event data inputs for producing digital threat scores using the target model and the successor model. That is, S250 may function to synthesize sufficient machine learning data inputs (e.g., synthetic digital events data) for the incumbent model and the successor model that enables digital threat scores collected and stored therefrom by their respective reservoirs to meet or satisfy the (completion) thresholds that indicate when a sufficient count of digital scores have been achieved for generating a complete score distribution.

In this further variant, S250 may function to derive or synthesize machine learning data inputs using historical digital events data for a specific service provider. Preferably, S250 functions to use the existing digital events data that may have already been used as input into an incumbent digital threat ML model for a service provider as basis to predict or derive synthetic or artificial digital events data inputs. Additionally, or alternatively, S250 may use platform data (e.g., data derived or collected from all computations of a digital threat mitigation platform, as described herein) or model data from comparable or cognate sources to assist in a calculation of synthetic digital events data inputs for generating additional digital threat scores. It shall be noted that S250 may use any suitable source to generate synthetic digital events or machine learning data inputs for the target incumbent and successor models.

In yet an event further variant, S250 may function to switch the configuration or mode of the incumbent digital threat ML model and the successor digital threat ML model from a first mode in which digital events data inputs (e.g., machine learning data inputs) are provided for producing digital threat scores to a second mode in which no digital events data inputs are provided to the incumbent and successor models for producing sufficient digital threat scores for completing score distributions. That is, in some embodiments, a target or incumbent digital threat ML model as well as a successor model may be triggered to complete their score distributions by automatically generating digital threat scores event absent new digital events data. Accordingly, the second mode or the incumbent model and the successor model may include the selective activation of predictive components of their respective algorithms that enable the respective models to generate synthetic or artificial digital threat scores without a need for digital events or machine learning inputs. A synthetic or an artificial digital threat score, as referred to herein, may typically include digital threat scores produced by a digital threat model that are produced without receiving machine learning data inputs based on an occurrence of real world digital events (e.g., an online fraud transaction, online content abuse, etc.) and are self-generated by a target ML model and/or successor ML model.

In response to detecting that one or more remapping conditions are satisfied, S250 may additionally function to calibrate scoring outputs of the successor digital threat ML model. That is, S250 preferably functions to identify, within a second digital threat score reservoir (or the like), a latest in time (uncalibrated) score distribution of a successor digital threat ML model and calibrate the digital threat scores of the uncalibrated score distribution based on a score distribution of a target model (e.g., an incumbent ML model). Preferably, the generation of the uncalibrated score distribution of the successor ML model and the score distribution of the incumbent ML model may be based on same digital event data inputs. That is, for a given digital event data input, each of the incumbent and successor ML models may function to generate an output threat score.

Specifically, the detection of the satisfaction of the one or more predicates to a remapping (i.e., the one or more remapping conditions) may function to trigger, a remapping function that generally operates to select or identify a latest in time digital threat score distribution and associated quantiles data of an incumbent digital threat ML model and a latest in time digital threat (uncalibrated) score distribution of a successor model. In the remapping function, S250 may function to set the score distribution of the incumbent ML model as a reference score distribution to which the uncalibrated score distribution of the incumbent ML model may be remapped based on. That is, S250 may generally function to remap the digital threat scores within the uncalibrated score distribution of the incumbent ML model with respect to digital threat scores within the score distribution of incumbent ML model.

In a preferred embodiment, the remapping function implemented by S250 includes applying a monotonic function to the digital threat scores of the uncalibrated score distribution of the successor digital threat ML model. The monotonic function as applied by S250 may function to (approximately) preserve the score distribution of the incumbent model such that the score distribution of the uncalibrated distribution of the incumbent model shares the score distribution of the incumbent model.

Additionally, as mentioned above, S250 may function to apply the monotonic remapping function in such a manner that preserves the accuracy characteristics of the uncalibrated score distribution of the successor digital threat ML model. That is, the monotonic remapping function as applied in S250 functions to preserve the receiver operating characteristics (ROC) curve of the uncalibrated score distribution of the successor ML model within the ROC curve of the calibrated score distribution of the successor ML model. Accordingly, in preferred embodiments, S250 may function to apply the remapping function such that the ROC curves of the uncalibrated score distribution and the calibrated score distribution of the successor ML model are the same or substantially the same (e.g., between 90% to 99%+ match or overlap of area under curve (AUC) the ROCs for the respective score distributions).

Additionally, or optionally, S255 may function to test a behavior of the calibrated successor model to confirm that the classification accuracy of the calibrated successor model is improved relative to a classification accuracy of the prior or incumbent model. Accordingly, S255 may function to enable same digital event data to be received by the incumbent model as well as the calibrated successor model. S255 may subsequently generate an ROC curve for each of the incumbent model and the calibrated successor model to verify that the area under curve (AUC) of the ROC curve for the calibrated successor model is greater than the AUC of the ROC curve for the incumbent model. In the case that the AUC of the ROC curve of the calibrated successor model is greater than the AUC of the ROC curve of the incumbent model, S255 may function to validate the improved classification and/or predictive accuracy of the calibrated successor model.

Additionally, or optionally, S255 may function to test a behavior of the calibrated successor model relative to a classification accuracy of the uncalibrated successor model. Accordingly, S255 may function to enable same digital event data to be received by the uncalibrated successor model as well as the calibrated successor model. S255 may subsequently generate an ROC curve for each of the uncalibrated successor model and the calibrated successor model to verify that the area under curve (AUC) of the ROC curve for the calibrated successor model is the same as the AUC of the ROC curve for the uncalibrated successor model. In the case that the AUC of the ROC curve of the calibrated successor model is the same as the AUC of the ROC curve of the uncalibrated successor model, S255 may function to validate an equivalence of the uncalibrated and calibrated scores of the successor model thereby indicating that the classification and/or predictive accuracy of the uncalibrated successor model is preserved within the calibrated successor model.

In such preferred embodiment, the remapping function implemented by S250 may function to use the quantiles data stored in association with or electronically linked to the score distribution of the incumbent ML model to generate quantiles for the uncalibrated score distribution of the successor ML model. Preferably, in remapping between the score distribution of the incumbent model and the uncalibrated score distribution of the successor model, S250 may function to write or produce quantiles that are copied or substantially copied from the existing quantiles of the score distribution of the incumbent model for generating a new calibrated score distribution for the successor model. Accordingly, S250 may first set the quantiles for the new calibrated score distribution and subsequently, rewrite or convert the uncalibrated digital threat scores of the uncalibrated score distribution of the successor model into the indices defined by the quantiles of the calibrated score distribution. The quantiles may include a plurality of a set of values or thresholds that define indices into which a set of digital threat scores may reside therein. Example indices of quantiles may include: 0.0-0.25 [$1^{st}$ index], 0.25-0.50 [$2^{nd}$ index], 0.50-0.75 [$3^{rd}$ index], and 0.75-1.0 [$4^{th}$ index]. In this example, the quantiles comprise quartiles in which four equal indices are established.

S250 may function to apply the remapping function to create digital threat score pairings between each digital threat score of the score distribution of the uncalibrated successor model and each digital threat score of the calibrated score distribution such that each uncalibrated digital threat score of the uncalibrated score distribution is mapped to a respective digital threat score of the calibrated score distribution of the successor digital threat ML model. Preferably, the uncalibrated digital threat scores are mapped to calibrated digital threat scores appearing in the same rank order or count within the calibrated score distribution of the successor digital threat ML model. For instance, two threat scores from the uncalibrated successor model may be mapped to two calibrated scores of the successor model that are in the same rank order. Accordingly, in such example, if a first rank ordered uncalibrated score is smaller than a second rank ordered uncalibrated score of the uncalibrated successor model, then the remapping function operates such that a first calibrated score will also be smaller than a second calibrated score of the calibrated successor model. Accordingly, the remapping function is preferably rank order preserving such that the order of the uncalibrated scores of the uncalibrated successor model is preserved within the calibrated scores of the calibrated successor model.

Accordingly, once the uncalibrated digital threat scores of the uncalibrated score distribution of the successor model are mapped to equally ranked or ordered digital threat scores of the score distribution of the calibrated successor model and the quantiles for the new calibrated score distribution are set, S250 applying the monotonic function rewrites the uncalibrated scores to fit within the quantiles of the new calibrated score distribution such that a count of digital threat scores set between each index of the new calibrated score distribution matches (or substantially matches) a count of digital threat scores of the score distribution of the incumbent model. That is, the new calibrated score distribution of the successor model may be remapped or written such that the new calibrated score distribution captures the same (or substantially the same) quantiles as the score distribution of the incumbent model and captures a same (or substantially the same) count of digital threat scores within the indices of the quantiles of the new calibrated score distribution as the count of digital threat scores within the indices of the quantiles of the score distribution of the incumbent model.

It shall be noted that the remapping function applying a monotonic function to the uncalibrated digital threat scores of the uncalibrated digital threat score distribution functions to rewrite one or more of the uncalibrated digital threat scores such that the rewritten or calibrated digital threat scores appear in the same rank order and within a same index as it paired digital threat score within the score distribution of the incumbent model.

Accordingly, the remapping between the score distribution of the incumbent model and the score distribution of the uncalibrated score distribution of the uncalibrated successor model generates a new calibrated score distribution of the successor model in which the new calibrated score distribution of the successor model approximately matches the score distribution of the incumbent model thereby maintain score distributions between incumbent model and the calibrated successor model. It shall be noted that while the uncalibrated scores may be rewritten or transformed to maintain a rank order position and index position as its pairing within the score distribution of the incumbent model, the remapping function may not necessarily rewrite the calibrated score to match its corresponding pair within the score distribution of the incumbent model. Rather, the monotonic function of the remapping aims to preserve in the new calibrated score distribution the rank order and index location of the pairings of the digital threat scores of the score distribution of the incumbent model and the digital threat scores of the uncalibrated score distribution of the successor model.

Additionally, or alternatively, once a remapping of the uncalibrated digital threat score distribution to a new calibrated digital threat score distribution is established, S250 may function to record or store the new calibrated score distribution within a third reservoir. The new calibrated score distribution may be stored within the third reservoir in electronic association with the score distribution of the successor model and the uncalibrated score distribution of the incumbent model used in producing the new calibrated score distribution.

S260, which includes returning one or more digital threat scores, functions to identify a remapping status of the third reservoir to determine whether a remapping is recorded therein and return a digital threat score based on a remapping status. Specifically, while a successor model is implemented in a private or shadow mode and a remapping between the digital threat score distributions of the incumbent model and the successor model is not complete, S260 typically functions to return or publicly expose a digital threat score, in response to a request for a digital threat score or the like, based primarily on scores generated by the incumbent model. That is, in the absence of a valid or complete remapping and production of a calibrated score distribution of the successor model, S260 continues to publicly expose or return only those digital threat scores produced by incumbent models.

If the remapping status within the third reservoir indicates that a remapped or calibrated digital threat score distribution is recorded therein, S260 may function to publicly expose or return the calibrated digital threat score produced by the successor digital threat ML model in the place of the corresponding digital threat score generated by the incumbent digital threat ML model. That is, when the remapping conditions are satisfied, a system and/or platform implementing the method 200 produces the calibrated digital threat scores in response to a request for a digital threat score.

In one variant, once the remapping conditions are satisfied (e.g., a calibrated score distribution is recorded in the $3^{rd}$ reservoir), S260 may function to return both the calibrated digital threat score of the successor model as well as the digital threat score of the incumbent model. A system or platform implementing the method 200 may function to present both the calibrated digital threat score and the incumbent digital threat score for a predetermined period and once the period is completed, S260 may return only the calibrated digital threat score.

In a second variant, S260 may function to return an ensemble of the threat scores produced by the calibrated digital threat score of the successor model and the threat score of the incumbent model. In such variant, S260 may function to compute a simple average between the calibrated threat score and the threat score of the incumbent model. Additionally, or alternatively, S260 may function to perform a weighted average in which different coefficients are applied against the calibrated score and the threat score of the incumbent model. In a preferred embodiment of this second variant, S260 may function to apply a coefficient or weight to the calibrated threat score that is larger than the coefficient or weight applied to the threat score of the incumbent model.

The system and methods of the preferred embodiment and variations thereof can be embodied and/or implemented at least in part as a machine configured to receive a computer-readable medium storing computer-readable instructions. The instructions are preferably executed by computer-executable components preferably integrated with the system and one or more portions of the processors and/or the controllers. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

Although omitted for conciseness, the preferred embodiments include every combination and permutation of the implementations of the systems and methods described herein.

As a person skilled in the art will recognize from the previous detailed description and from the figures and claims, modifications and changes can be made to the preferred embodiments of the invention without departing from the scope of this invention defined in the following claims.

What is claimed:

1. An online system for evolving one or more machine learning models for identifying new and/or different digital threats and neutralizing digital threats by calibrating the one or more machine learning model, the system comprising:
    a non-transitory computer-executable medium storing computer instructions that when executed by one or more computer processors provides an application programming interface that is in interactive communication with one or more endpoints of a machine learning service to control and/or operate one or more functions of an ensemble of machine learning models that are used to generate a digital threat score based on digital event data, wherein the digital event data relate to online activities of one or more users involved with one or more digital services provided by an online service provider;
    the machine learning service being implemented by one or more hardware computer servers comprises:
        a digital threat score reservoir that:
            collects incumbent digital threat scores generated by an incumbent machine learning model and successor digital threat scores generated by an uncalibrated successor digital threat machine learning (ML) model;
            generates an incumbent threat score distribution based on the incumbent digital threat scores and generates an uncalibrated successor threat score distribution based on the successor digital threat scores;
            captures quantiles data from the incumbent digital threat score distribution and the uncalibrated successor score distribution;
        a remapping module that generates a calibrated successor digital threat machine learning model by:
            applying the quantiles of the incumbent digital threat score distribution to the uncalibrated successor digital threat score distribution;
            remapping the successor digital threat scores of the successor digital threat score distribution based on the incumbent digital threat scores of the incumbent digital threat score distribution;
            using the remapping of the successor digital threat scores and the quantiles of the incumbent digital threat scores to transform the successor digital threat scores to calibrated digital threat scores of the calibrated digital threat score distribution; and
        wherein response to transforming the successor digital threat scores to calibrated successor digital threat scores, returning a calibrated successor digital threat score in response to the request for the digital threat score for a digital event or a digital actor;
        wherein in response to returning the calibrated successor digital threat score, performing by the online service provider one or more of automatically approving, holding, and cancelling an activity or an online transaction associated with the digital event data based on a comparison of the calibrated digital threat score to an online service provider-specific score threshold to neutralize a digital threat associated with the activity or the online transaction.

2. The system according to claim 1, wherein:
in response to receiving a request for a digital threat score for a digital event or for a digital actor, the machine learning service provides equivalent digital event data as machine learning input into both the incumbent digital threat ML model and the successor digital threat ML model.

3. The system according to claim 1, wherein the calibrating includes:
generating a monotonic function based on the quantiles data of the incumbent digital threat score distribution and the quantiles data of the uncalibrated successor digital threat score distribution;
applying the monotonic function to the uncalibrated successor digital threat score distribution to preserve a score distribution pattern of the incumbent digital threat score distribution.

4. The system according to claim 1, wherein:
the remapping is triggered based on a detection of an existence of a record of the quantiles data of the incumbent digital threat score distribution and an existence of records of the incumbent digital threat score distribution and the successor digital threat score distribution.

5. A method of evolving one or more machine learning models of a machine learning-based digital threat detection system for identifying new and/or different digital threats and neutralizing digital threats by calibrating the one or more machine learning models, the method comprising:
implementing a non-transitory computer-executable medium storing computer instructions that when executed by one or more computer processors provides an application programming interface that is in interactive communication with one or more endpoints of a machine learning service to control and/or operate one or more functions of an ensemble of machine learning models that are used to generate a digital threat score based on digital event data, wherein the digital event data relate to online activities of one or more users involved with one or more digital services provided by an online service provider;
collecting digital threat scores of an incumbent digital threat machine learning (ML) model;
identifying an incumbent digital threat score distribution of the digital threat scores of the incumbent digital threat ML model;
identifying quantiles data of the incumbent digital threat score distribution;
collecting digital threat scores of a successor digital threat machine learning (ML) model;
identifying an uncalibrated successor digital threat score distribution of the digital threat scores of the successor digital threat ML model;
identifying quantiles data of the uncalibrated successor digital threat score distribution;
calibrating the uncalibrated successor digital threat ML model by calibrating the digital threat scores of the successor digital threat score distribution based on the quantiles data of the incumbent digital threat score distribution and the incumbent digital threat score distribution, wherein the calibrating includes:
remapping the digital threat scores of the uncalibrated successor digital threat score distribution based on the digital threat scores of the incumbent digital threat score distribution, wherein the remapping includes:
applying the quantiles data to the remapping of the digital threat scores of the uncalibrated successor digital threat score distribution;
configuring the digital threat scores of the uncalibrated successor digital threat score distribution to fit within a plurality of indices of the quantiles data;
wherein response to the remapping of the digital threat scores of the uncalibrated successor digital threat score distribution, the machine learning system publishes calibrated successor digital scores in lieu of the incumbent digital threat scores based on one or more requests for digital threat scores; and
wherein in response to obtaining a calibrated successor digital threat score, performing by the online service provider one or more of automatically approving, holding, and cancelling an activity or an online transaction associated with the digital event data based on a comparison of the calibrated digital threat score to an online service provider-specific score threshold to neutralize a digital threat associated with the activity or the online transaction.

6. The method according to claim 5, further comprising:
implementing the incumbent digital threat ML model in a public mode of operation, wherein the digital threat scores generated by the incumbent ML model are publicly returned in response to a request for a digital threat score for a digital event or a digital actor, and
implementing the uncalibrated successor digital threat ML model in a private mode of operation, wherein the digital threat scores generated by the uncalibrated successor digital threat ML model are privately stored and not publicly returned in response to the one or more requests for the digital threat score for the digital event.

7. The method according to claim 6, wherein:
implementing the incumbent digital threat ML model and the successor digital threat ML model are operated in parallel.

8. The method according to claim 5, further comprising:
in response to receiving a request for a digital threat score for a digital event or a digital actor, providing equivalent digital event data associated with the digital event or the digital actor as machine learning input into both the incumbent digital threat ML model and the uncalibrated successor digital threat ML model.

9. The method according to claim 5, wherein the remapping includes:
generating a monotonic function based on the quantiles data of the incumbent digital threat score distribution and the quantiles data of the uncalibrated successor digital threat score distribution;
applying the monotonic function to the uncalibrated successor digital threat score distribution to preserve the incumbent digital threat score distribution.

10. The method according to claim 5, wherein:
the remapping is triggered based on a detection of a record of the quantiles data of the incumbent digital threat score distribution and records of the incumbent and successor digital threat score distributions.

11. The method according to claim 5, further comprising:
generating a count value for each of the incumbent digital threat scores and for each of the successor digital threat scores, wherein:
the remapping includes pairing incumbent digital threat scores and successor digital threat scores having a same count value.

12. The method of claim 5, wherein the machine learning service calibrates the uncalibrated successor machine learning model without knowledge of automated decisioning thresholds of a service provider.

13. The method of claim 5, further comprising:
testing a classification accuracy of the calibrated successor machine learning model, wherein testing includes:
providing a same digital event data input set to the uncalibrated successor machine learning model and the calibrated successor machine learning model;
generating score distributions of each of the uncalibrated successor machine learning model and the calibrated successor machine learning model;
generating a receiver operating characteristics curve for the score distributions of each of the uncalibrated successor machine learning model and the calibrated successor machine learning model;
identifying a level of match between the receiver operating characteristics curves for the uncalibrated successor machine learning model and the calibrated successor machine learning model.

14. The method of claim 5, further comprising:
measuring a sensitivity level of a service provider to a proposed migration to the uncalibrated successor model; and
if the sensitivity level satisfies one or more sensitivity thresholds, triggering an automatic calibration of the uncalibrated successor machine learning model.

15. The method of claim 5, further comprising:
measuring a sensitivity level of a service provider to a proposed migration to the uncalibrated successor model; and
if the sensitivity level does not satisfy one or more sensitivity thresholds, triggering an automatic live implementation of the uncalibrated successor machine learning model.

16. A method of evolving one or more machine learning models of a machine learning-based digital threat detection system for identifying new and/or different digital threats and neutralizing digital threats by calibrating the one or more a machine learning models, the method comprising:
implementing a non-transitory computer-executable medium storing computer instructions that when executed by one or more computer processors provides an application programming interface;
receiving, via the application programming interface, one or more requests by an online service provider for one or more machine learning scores;
generating a first score distribution for an active machine learning model and a second score distribution for a nascent machine learning model based on a same input dataset;
acquiring quantiles data from each of the first and second score distributions;
computing a monotonic remapping function based on the quantiles data for each of the first and the second score distributions;
transforming the nascent machine learning model to a calibrated machine learning model by applying the monotonic remapping function to the second score distribution of the nascent machine learning model;
implementing the calibrated machine learning model within a machine learning service and returning the one or more machine learning scores using the calibrated machine model in response to the one or more requests for machine learning scores; and
wherein in response to obtaining the one or more machine learning scores, performing by the online service provider one or more of automatically approving, holding, and cancelling an activity or an online transaction associated with the digital event data based on a comparison of the one or more machine learning score to an online service provider-specific score threshold to neutralize a digital threat associated with the activity or the online transaction.

* * * * *